United States Patent
Robert

(10) Patent No.: US 9,413,743 B2
(45) Date of Patent: *Aug. 9, 2016

(54) TRUST BASED DIGITAL RIGHTS MANAGEMENT SYSTEMS

(71) Applicant: Disney Enterprises, Inc., Burbank, CA (US)

(72) Inventor: Arnaud Robert, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,370

(22) Filed: Sep. 3, 2014

(65) Prior Publication Data

US 2014/0373113 A1    Dec. 18, 2014

Related U.S. Application Data

(63) Continuation of application No. 12/190,396, filed on Aug. 12, 2008, now Pat. No. 8,863,303.

(51) Int. Cl.
| | | |
|---|---|---|
| *H04L 29/06* | (2006.01) | |
| *G11B 20/00* | (2006.01) | |
| *G06F 21/62* | (2013.01) | |
| *G06F 21/10* | (2013.01) | |

(52) U.S. Cl.
CPC ............. *H04L 63/08* (2013.01); *G06F 21/10* (2013.01); *G06F 21/6218* (2013.01); *G11B 20/00086* (2013.01)

(58) Field of Classification Search
CPC ............................ G06F 21/10; G06F 21/6218
USPC ............................................ 726/7, 27–29, 5
See application file for complete search history.

(56) References Cited

U.S. PATENT DOCUMENTS

| | | | |
|---|---|---|---|
| 7,086,085 B1 * | 8/2006 | Brown et al. ..................... 726/7 |
| 7,676,846 B2 * | 3/2010 | Robert et al. ..................... 726/27 |
| 7,865,603 B2 * | 1/2011 | Braddy et al. ..................... 709/229 |
| 2003/0131096 A1 * | 7/2003 | Goringe et al. ..................... 709/224 |
| 2005/0235341 A1 * | 10/2005 | Stieglitz et al. ..................... 726/5 |
| 2007/0155366 A1 * | 7/2007 | Manohar et al. ..................... 455/411 |
| 2007/0156601 A1 * | 7/2007 | Brew et al. ..................... 705/57 |
| 2007/0162400 A1 * | 7/2007 | Brew et al. ..................... 705/59 |
| 2007/0265907 A1 * | 11/2007 | Adduci et al. ..................... 705/10 |
| 2008/0005806 A1 * | 1/2008 | Alve ..................... 726/30 |
| 2008/0027868 A1 * | 1/2008 | Ljung et al. ..................... 705/51 |
| 2008/0148414 A1 * | 6/2008 | Tom ..................... 726/29 |
| 2008/0228578 A1 * | 9/2008 | Mashinsky ..................... 705/14 |
| 2008/0250508 A1 * | 10/2008 | Montague et al. ..................... 726/28 |
| 2009/0007240 A1 * | 1/2009 | Vantalon et al. ..................... 726/4 |
| 2009/0064319 A1 * | 3/2009 | Jeganathan et al. ..................... 726/19 |
| 2011/0112917 A1 * | 5/2011 | Driessen ..................... 705/16 |

* cited by examiner

*Primary Examiner* — Saleh Najjar
*Assistant Examiner* — Peiliang Pan
(74) *Attorney, Agent, or Firm* — Farjami & Farjami LLP

(57) ABSTRACT

A system and method for allowing access to digitally protected content are disclosed. License metadata and credentials from multiple types of digital rights management systems may be used to grant access to content protected by a different type of digital rights management system. Hierarchical levels of access to the content may be granted based on at least one of license metadata and credentials.

16 Claims, 10 Drawing Sheets

TRUST BASED DIGITAL RIGHTS MANAGEMENT SYSTEMS

This application is a Continuation of U.S. patent application Ser. No. 12/190,396, filed Aug. 12, 2008.

BACKGROUND OF THE INVENTION

1. Field of the Invention

This application generally relates to digital rights management systems (hereafter referred to as DRM systems). Specifically, this application relates to the interoperability between different types of DRM systems and a trust model between those.

2. Description of the Related Technology

The proliferation of computing devices within our society has greatly increased in the past years. Where computing devices such as computers were previously used by scientist and engineers, now, a large percentage of society has access to or owns at least one computing device. In addition, many different types of computing devices have been created. Personal digital assistants (PDAs), smartphones, portable media players, and laptops have all become mainstream items.

Along with this huge growth of computing devices, the usage of digital media has grown as well. Books are now available in electronic format, movies and music are now available for download or for streaming, and photographs may now be accessed electronically. As with any media or copyrighted material, the authors, creators and distributors of such media wish to manage the access to the media. In response to the huge growth of digital media, DRM systems were created in the early '90s.

A digital rights management (DRM) system generally comprises access control and rights validation technologies to manage usage of digital media, in a way to offer a broad range of offerings and choices to meet the different needs of consumers. Publishers may want to limit the number of times a movie may be viewed, or to limit the number of times a particular media may be copied. There are generally three types of DRM system in use. The first is an identity-based DRM system, where access to digital media is allowed based upon verification of the identity of the user. For example, a user may enter a username and password to view the media. The second is a device-based DRM system, where access to digital media is allowed based on the validation of a unique identity of the device that is accessing the media. For example, the media will only play on a specific device. The third is a domain-based DRM system, where access to the digital media is allowed depending on whether or not a device is within a domain of identified devices. For example, all of the computers within a household may view the media. Even within the different types of DRM systems, different versions of DRM systems have been deployed in the marketplace.

SUMMARY OF THE INVENTION

In one embodiment, there is a method for accessing digital content protected by a first digital rights management system, the method comprising receiving license metadata, wherein the license metadata is associated with a second digital rights management system, verifying the license metadata, deriving access data using the license metadata and enabling access to the digital content using the access data.

In another embodiment, there is a system for accessing digital content protected by a first digital rights management system, the system comprising a first digital rights management system configured to provide license metadata to an authorization module, wherein the license metadata is associated with a second digital rights management system, wherein the authorization module is configured to verify the license metadata, derive access data using the license metadata and enable access to the content using the access data.

In another embodiment, there is a method for accessing digital content protected by a first digital rights management system, the method comprising receiving license metadata from the first digital rights management system, providing the license metadata to the second digital rights management system for verification, receiving access data from the second digital rights management system, based on the license metadata and enabling access to the digital content using the access data.

In another embodiment, there is a system for accessing digital content protected by a first digital rights management system, the system comprising a first digital rights management system configured to provide license metadata to an authorization module and wherein the authorization module is configured to provide the license metadata to a second digital rights management system, receive access data from the second digital rights management system, based on the license metadata and enable access to the content using the access data.

In another embodiment, there is a system for accessing digital content protected by a first digital rights management system, the system comprising a first digital rights management system configured to provide license metadata to an authorization module and wherein the authorization module is configured to provide the license metadata to a second digital rights management system, receive access data from the second digital rights management system, based on the license metadata and enable access to the content using the access data.

In another embodiment, there is a method for accessing digital content protected by a first digital rights management system, the method comprising receiving, from an application not associated with the first digital rights management system, a request to access the digital content and a first set of credentials, verifying the first set of credentials and instructing the first digital rights management system to grant the application access to the digital content based on the first set of credentials.

In another embodiment, there is a system for accessing digital content protected by a first digital rights management system, the system comprising an application not associated with the first digital rights management system, wherein the application is configured to request access to the digital content and to provide a first set of credentials, an authorization module configured to verify the first set of credentials and instruct the first digital rights management system to grant the application access to the digital content based on the first set of credentials.

DETAILED DESCRIPTION OF CERTAIN INVENTIVE EMBODIMENTS

Figure 1:
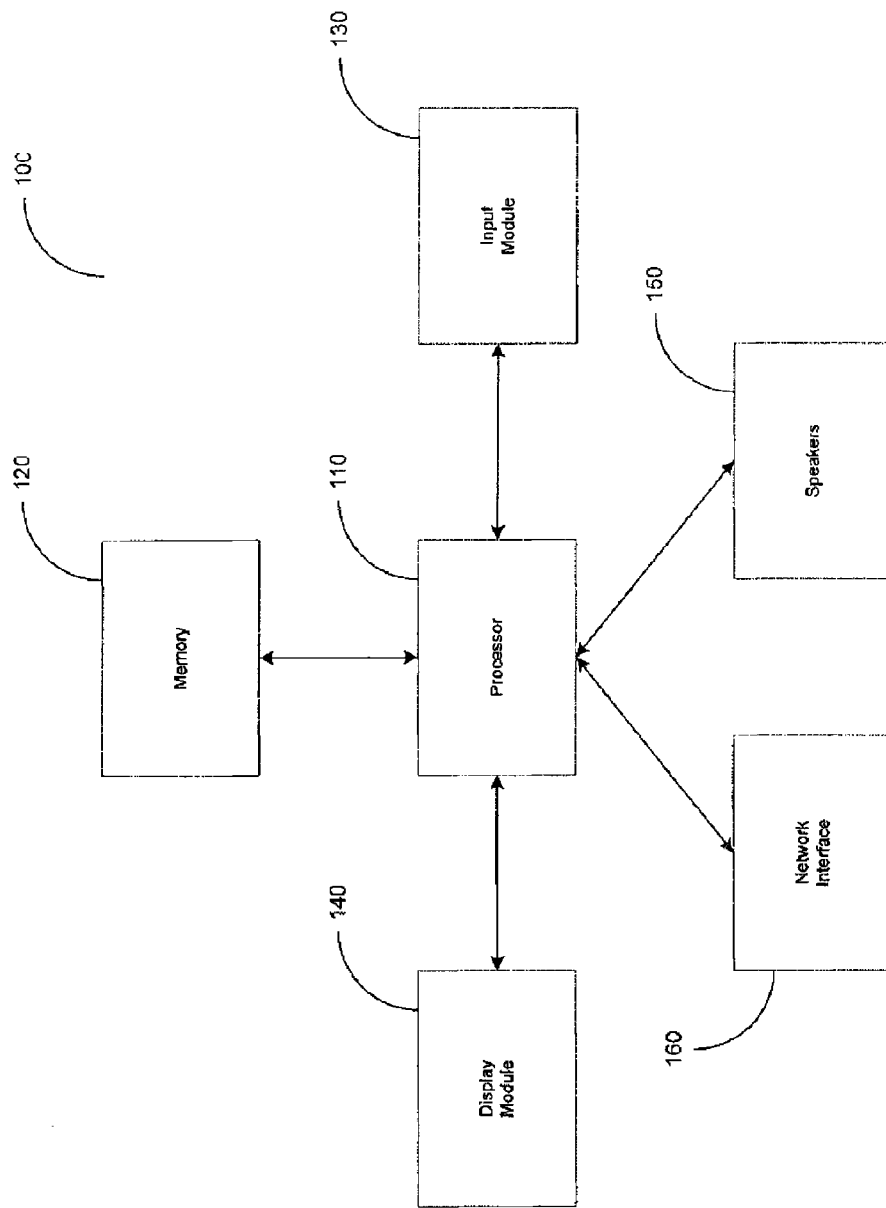
FIG. 1 is a block diagram of a computing device which may use various embodiments of the invention.

As the number of computing devices and the means to distribute digital media continue to grow, the amount of digitally protected content grows as well. As different types of DRM systems are created to protect media, problems arise due to incompatibilities between the DRM systems. For example, a company may protect media by only allowing such media to be played by the device that downloaded it. However, a user may want to play such media on a second device because he is not able to access the original device the content was downloaded on. Users and content providers alike need a method and system of allowing media to be accessed using credentials from a variety of DRM systems. A credential may comprise at least one of a user identifier, a device identifier, a domain identifier, and any information to validate those. In addition, content providers also need to be able to allow varying levels of access to the content depending on the credentials provided.

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The system is comprised of various modules, tools, and applications as discussed in detail below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C.++, BASIC, Visual Basic, Pascal, Ada, Java, HTML, XML and FORTRAN are industry standard programming languages for which many commercial compilers can be used to create executable code.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

FIG. 1 is a block diagram of a computing device 100 which may use various embodiments of the invention. The computing device 100 may comprise a processor 110, a memory 120, an input module 120, a display module 140 and speakers 150. The processor 110 which may comprise any general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), or any special purpose microprocessor such as a digital signal processor, microcontroller, or a programmable gate array. Memory 120 may comprise a hard disk, RAM, ROM, a memory card, CD-ROM, DVD-ROM, or some other means for storing data. Input module 130 may comprise a keyboard, mouse, touch pad, touch screen, lever, knob, dial, slider, or some other means for providing user input. Display module 140 may comprise an LCD monitor, a CRT monitor, a plasma monitor, a touch screen or some other means for displaying media. Speakers 150 may comprise speakers, headphones, or some other means for playing audio output. Network interface 150 may comprise a wired network card, a wireless network card, or some other means for communicating with a network. Network interface 150 may be connected to a local area network (LAN), or a wide area network (e.g. internet) or some other form of network. Network interface 160 may receive signals according to wired technologies including but not limited to Ethernet, telephone (e.g., POTS), and fiber optic systems, and/or wireless technologies including but not limited a code division multiple access (CDMA or CDMA2000) communication system, a GSM/CPRS (General Packet Radio Service)/EDGE (enhanced data GSM environment) or an IEEE 802.11b system.

Figure 2:
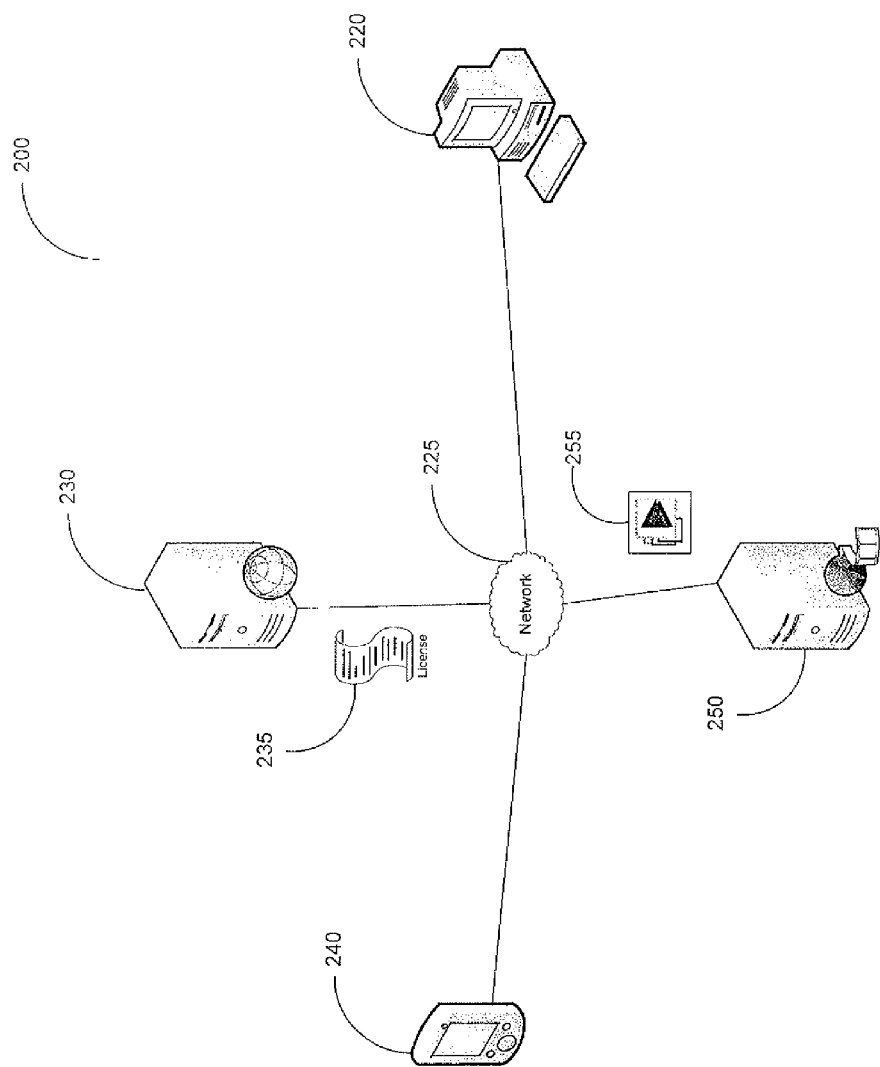
FIG. 2 is a diagram illustrating a DRM system which may use embodiments of the invention.

FIG. 2 is a diagram illustrating a DRM system 200 which may use embodiments of the invention. Digitally protected content 255 is stored on file server 250. The digitally protected content 255 may be provided by a content distributor. License 235 is stored in license server 230. The license 235 may also be provided by the content distributor. Computing device 220 may be a desktop or laptop computer. Computing device 240 may be a PDA or smartphone. License server 230, file server 250 and computing devices 220 and 240 are connected to a network 225. Network 225 may be a local area network, a wide area network such as the internet, or a wireless network. Computing devices 220 and 240 may download the digitally protected content 255 from the file server 250. In order for computing devices 220 and 240 to play the digitally protected content 255, they will download a license 235 from the license server 230. The license 235 may contain usage rights to the digitally protected content 255, a key to decrypt the digitally protected content 255, information about the devices 220 or 240, and other information. License 235 may be bound to digital devices 220 or 240. The license 235 is configured to control the access to digitally protected content 255. In some DRM systems, license 235 and digitally protected content 255 may reside in the same location (e.g. on the same server). Computing devices 220 and 240 may retrieve both the license 235 and the digitally protected content 255 from the same location. In other systems, the license 235 may be integrated with the digitally protected content 255 (e.g. the license is in the same file as the digitally protected content).

Figure 3:
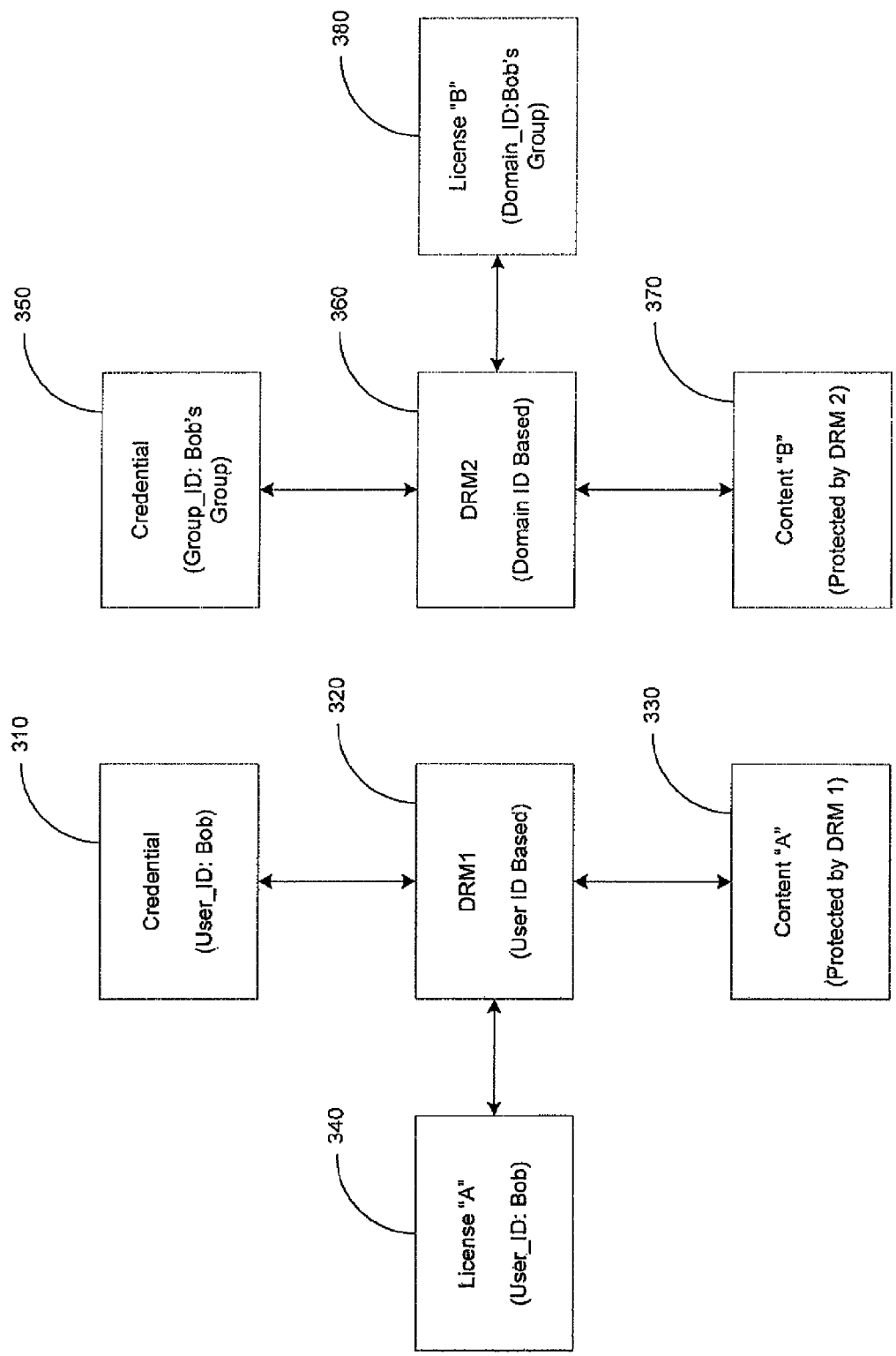
FIG. 3 is a block diagram illustrating how different components of a DRM system are associated with each other.

FIG. 3 is a block diagram illustrating how different components of a DRM system are associated with each other. Credentials 310 and 350 may be supplied by the user or the computing device that is attempting to access digitally protected content 330 and 370. In addition, a list of authorized credentials may be stored in licenses 340 and 380.

Credential 310 is a credential for identity-based DRM system 320. Credential 350 may contain user name and password information for the user "Bob." The credential 310 is made available to DRM system 320. The DRM system 320 will analyze the credential 310 and analyze the license 340 and possibly the digitally protected content 330 to determine if the credential is valid. The license 340 may contain a list of valid identities that are allowed to access digitally protected content 330. The license 340 may also contain a list of access permission to the digitally protected content 330. The different levels of access may include but are not limited to viewing, reading, copying, editing and recording the digitally protected content 330. If the credential 310 is valid (i.e. the identity of the user is verified), the DRM system 320 will allow the level of access specified in license 340 to the digitally protected content 330.

Credential 350 is a credential for device-based DRM system 360. Credential 310 may be a device ID for Bob's device. The credential 350 is made available to DRM system 360. The DRM system 360 will analyze the credential 350 and analyze the license 380 and possibly the digitally protected content 370 to determine if the credential is valid. The license 380 may contain a list of valid device IDs that are allowed to access digitally protected content 370. The license 380 may also contain a list of access permission to the digitally protected content 370 (e.g. read, write, copy). If the credential 350 is valid (i.e. the device ID is a device within Bob's Group), the DRM system 360 will allow the level of access specified in license 380 to the digitally protected content 370.

Figure 4:
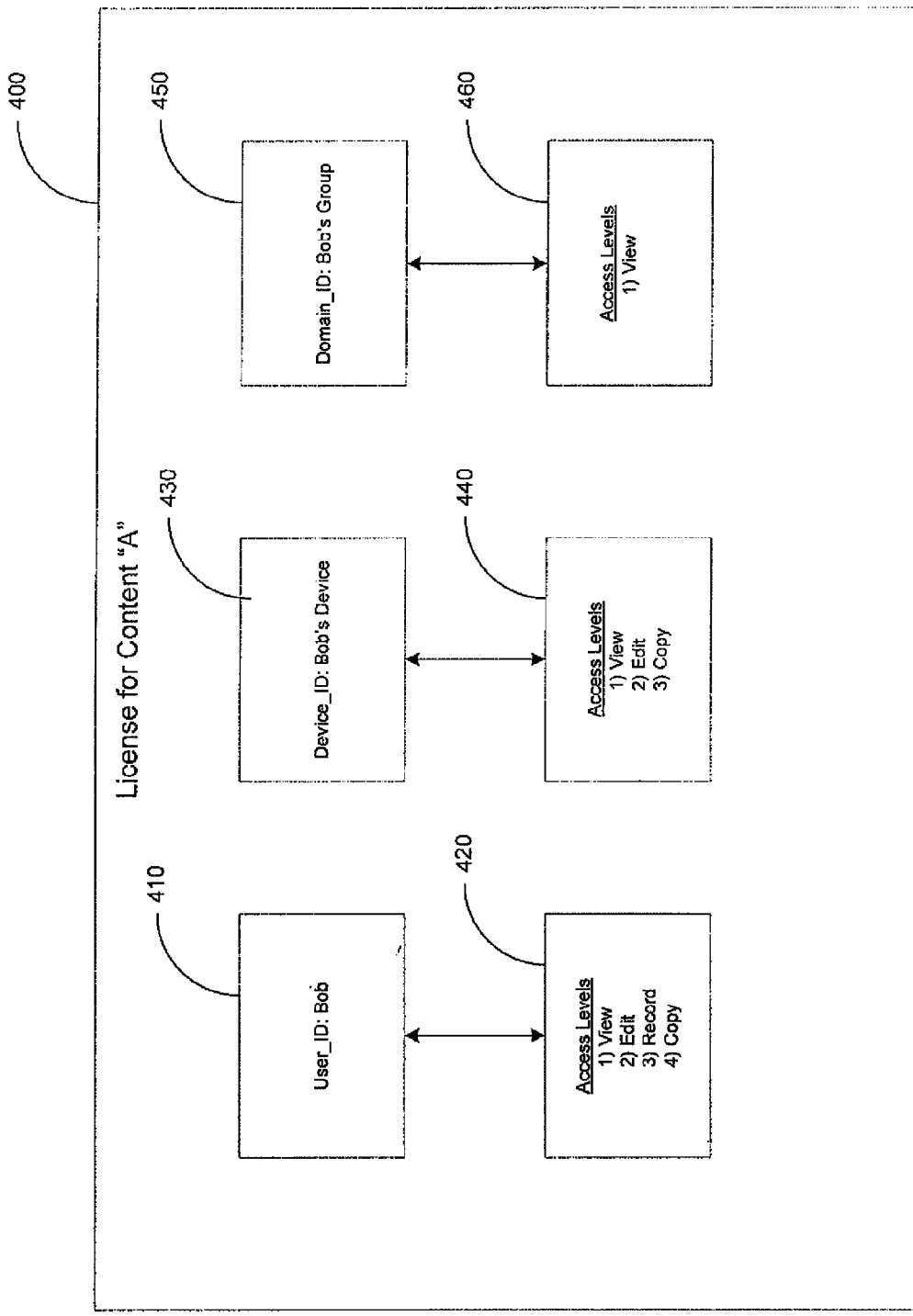
FIG. 4 is a block diagram illustrating the basic structure of a license used by embodiments of the invention.

FIG. 4 is a block diagram illustrating the basic structure of a license 400 used by embodiments of the invention. The license 400 may contain an encryption key to decrypt the content, access level information, and other information. The license 400 may also contain a link or a reference to the digitally protected content. The license 400 may additionally contain rules or usage rights regarding the level of access allowed to the digitally protected content. A license may contain information for multiple digitally protected contents. Each of the digitally protected contents may be protected by a different type of DRM system. Generally a license contains information for a single credential. However, a license may contain credential information for multiple credentials. Each of the multiple credentials may be a credential for a different type of DRM system. Each of the multiple credentials may be allowed varying levels of access to the digitally protected content. The access levels specified in the license may be hierarchical such that certain credentials may be allowed more levels of access then others. In addition, varying levels of access may be allowed for different combinations of credentials.

For example, a user may provide a credential to the DRM system. The DRM system will analyze the license and determine which types of credentials are allowed. It will then check if the provided credential is a first type of credential such as a user identity. If the provided credential is not a first type of credential, the system will the check for a second type of credential, such as a device ID. If the provided credential is not a second type of credential, the system will the check for a third type of credential, such as a domain ID. The first type of credential may grant the most levels of access to the digitally protected content. The second type of credential may grant fewer levels of access then the first type of credential. And the third type of credential may grant fewer levels of access then the second type of credential. The license may contain any combination of credential hierarchy and access levels. The claimed invention does not limit the number of credentials, the access levels or the different arrangements of the hierarchy of the credentials and access levels. In addition, the license may be modified by a DRM system to add or remove credentials. The license may also be modified to change the access levels allowed for the credentials. In another example, the license may only allow a user to view the content if he can provide a first type of credential, such as a user ID. However, if the user can provide a second type of credential as well, such as a device ID, then the license may allow a user view and copy the content.

License 400 allows access to digitally protected content "A." Digitally protected content "A" is protected by an identity-based DRM system. In license 400, three types of credentials are recognized and will allow access to digitally protected content "A." The credentials 410, 430 and 450 may be verified in a hierarchical manner. For example, the DRM system may check if a user provided credential is an identity-based credential 410, and then a device-based credential 430, and then a domain-based credential 450. Credential 410 is a user identity credential. It contains information about Bob's user ID and password and whether or not the user requesting access is Bob. Credential 410 allows four levels of access to digitally protected content "A" as listed in the access list 420. The levels of access allowed are view, edit, record and copy. Credential 430 is a device identity credential. It contains information about Bob's device and enables verification of whether or not the device requesting access is Bob's device. Credential 430 allows three levels of access to digitally protected content "A" as listed in the access list 440. The levels of access allowed are view, edit and copy. Credential 450 is a domain identity credential. It contains information about Bob's domain and enables verification of whether or not the device requesting access is within Bob's domain. Credential 450 allows three levels of access to digitally protected content "A" as listed in the access list 460. The level of access allowed is view.

Figure 5:
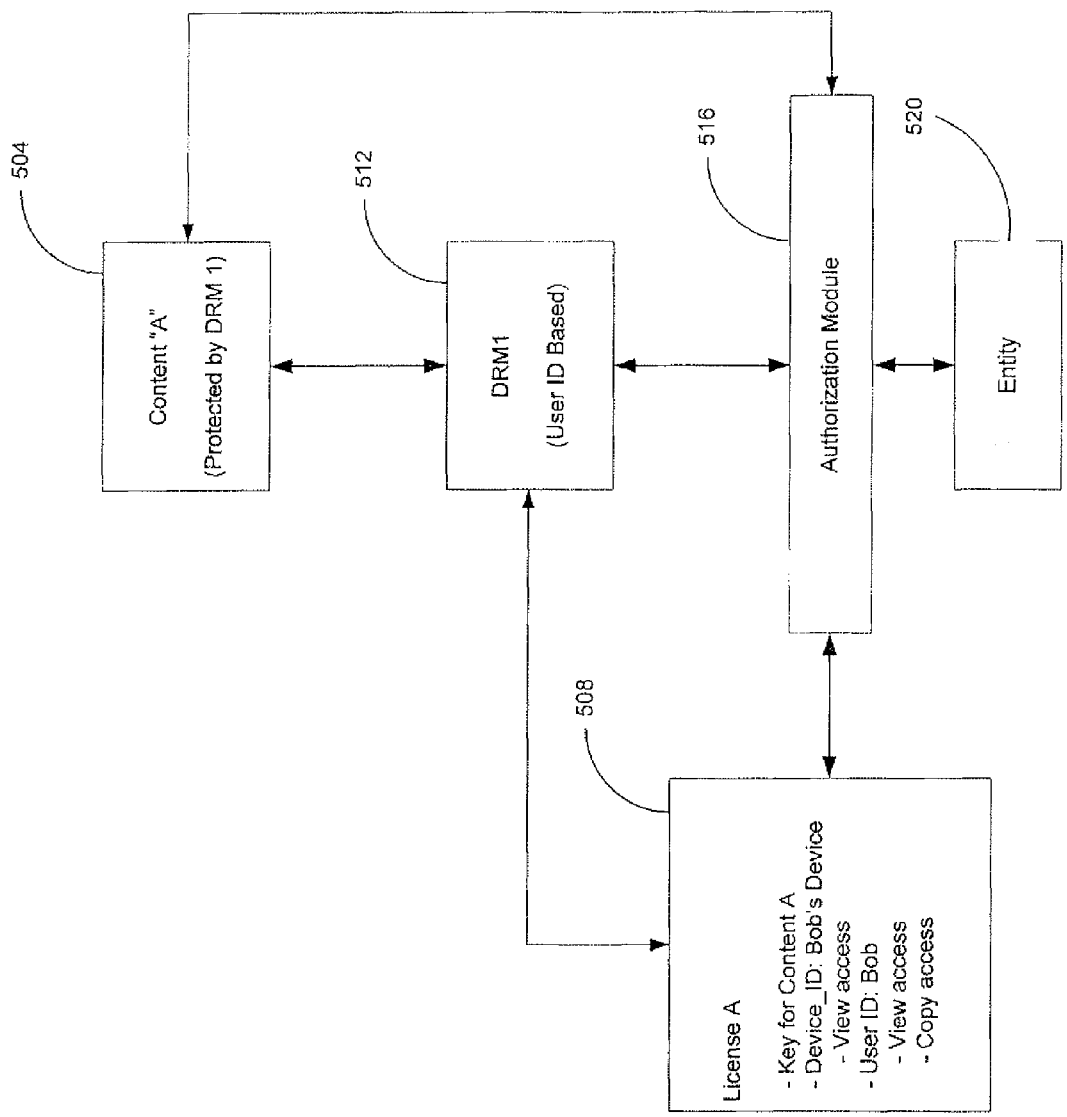
FIG. 5 is a block diagram illustrating a system for accessing digital content according to a first embodiment.

FIG. 5 is a block diagram illustrating a system for accessing digital content according to a first embodiment. The embodiment shown in this figure shows how a user can access a digitally protected content even though the DRM system protecting the content does not recognize the license metadata provided by the user. In the embodiment shown in FIG. 5, a user or application is attempting to access digitally protected content 504 which is protected using DRM system 512. In this example, license 508 is associated with content 504 and contains credential, key, usage rights, and access level information for content 504. The user provides license metadata, which is associated with a second DRM system, to the first DRM system 512. The second DRM system is not shown in FIG. 5. License metadata may comprise at least one of an encrypted key, a device ID, a user ID, and a domain ID.

In one embodiment, the second DRM system may be a completely different DRM system from the first DRM system 512. For example, DRM 512 may be the Apple FairPlay DRM system and license metadata may be associated with the Windows Media DRM system. In another embodiment, the second DRM may be a different and/or enhanced version of the first DRM system. For example, DRM system 512 may be version 1 of a particular type of DRM system which only accepts user identity credentials. The license metadata provided by the user or application may be associated with version 2 of the DRM system. Version 2 of the DRM system may have enhanced features. For example, version 2 of the DRM may use a different method of encrypting, may be able to access additional content formats, or it may accept more types of credentials then version 1 such as device identity credentials.

In one embodiment, the DRM system 512 then provides the license metadata to the authorization module 516. In another embodiment, the authorization module 516 may itself retrieve the license metadata from DRM system 512 or directly from license 508. The authorization module 516 then verifies the license metadata. For example, the authorization module 516 may verify that a device ID is valid. After verifying the license metadata, the authorization module 516 may derive access data using the license metadata. Access data may comprise at least one of an encrypted key, a key, and any information and/or data that may be used to retrieve a key. For example, the authorization module 516 may derive the key that may be used to access the content. Or, the authorization module 516 may derive a function which may be used to retrieve a key. After deriving the access data, the authorization module 516 enables access to the content 504 using the access data.

In one embodiment, the authorization module 516 may itself enable access to content 504. For example, after deriving a key using license metadata, the authorization module 516 may use the key to unlock the content 504. In another embodiment, the authorization module 516 may provide the access data to DRM system 512 and DRM system 512 may enable access to the content. For example, the authorization module 516 may derive a key using license metadata and then provide the key to DRM system 512. DRM system 512 may then use the key to unlock the content 504.

In another embodiment, an entity 520 such as a user or an application may provide at least one credential to the authorization module 516 for verification. For example, a user may have provided license metadata comprising a user ID such as an email address when attempting to access content 504. Authorization module 516 may verify that the email address provided is a valid email address. It may then prompt the user for a password. Authorization module 516 would then receive the password, verify that the password is valid for the email address, and then derive access data such as a key, based on the password and the license metadata. Alternatively, the authorization module 516 may derive access data based on only the license metadata, and use the credential for additional verification when enabling access to the content. For example, the authorization module 516 may derive access data based on the email address but may use the password for additional verification of the identity of the user or application requesting access to the content. After deriving the key, the authorization module 516 may then enable access to the content 504 or provide the key to DRM system 512 so that DRM system 512 may then enable access to the content 504.

In another embodiment, the license metadata containing the device ID may have been provided when attempting to access content 504. Authorization module 516 may verify that the device ID is valid. The authorization module 516 may then request that the user provide an additional credential, such as a username and the related password. Authorization module 516 would then receive the username and password, verify the username is valid and the password is associated to the username, and then derive access data such as a key, based on the license metadata and the username. Alternatively, the authorization module 516 may derive access data based on the license metadata, and use the credential for additional verification when enabling access to the content. For example, the authorization module 516 may derive access data based on the device ID but may use the username and password for additional verification of the identity of the user or application requesting access to the content. After deriving the key, the authorization module 516 may then enable access to the content 504 or provide the key to DRM system 512 so that DRM system 512 may then enable access to the content.

In some embodiments, different levels of access to content 504 may be granted based on the license metadata or based on the license metadata and at least one credential. The different levels of access granted to different license metadata and credentials may be hierarchical. Certain license metadata and credentials may be granted more access to content 504 then other license metadata and credentials. For example, if a valid device ID is provided to authorization module 516, the authorization module 516 may only enable read and copy access to content 504. However, if a valid user ID is provided to authorization module 516, the authorization module may enable read, copy, edit and record access to content 504. The hierarchical level of access may be specified in the license 508. For example, the license 508 itself may specify that a valid device ID is only allowed read and copy access to content 504. Or, the hierarchical levels of access may be contained within the authorization module 516. If no levels of access are specified for a license metadata or credential, a default level of access may be granted to content 504. The default level of access may be specified in the license 508 or within the authorization module 516. In another embodiment, if license metadata, such as a valid user ID and password is provided to authorization module 516, the authorization module 516 may only enable read and copy access to content 504. However, if a credential such as a valid device ID is provided to authorization module 516 in addition to the license metadata, the authorization module 516 may enable read, copy, edit and record access to content 504.

In certain embodiments, the authorization module 516 may be "trusted" by the different DRM systems it may interact with. For example, DRM system 512 trusts the authorization module 516 enough such that it will provide license metadata to authorization module 516, provide information to enable authorization module 516 to verify the license metadata, or will allow authorization module 516 to enable access to content 504. The authorization module 516 may communicate securely with DRM system 512. For example, authorization module 516 may use a secure or encrypted communication channel to communicate with the different DRM systems. There are many methods of secure communication including but not limited to using encrypted channels, using secured authenticated channels, and sending and receiving encrypted data. This specification does not limit the methods or systems that may be used by the authorization module 516 to securely communicate with different DRM systems.

In one embodiment, the authorization module 516 may be integrated with at least one of the different DRM systems. For example, the authorization module 516 may be included within the at least one of the DRM systems. In another embodiment, the authorization module 516 may be a separate module that is not integrated with any DRM system. For example, the authorization module 516 may comprise a software executable that resides in memory on a computing device and is executed by the computing device's processor. In some embodiments, the authorization module 516, the DRM systems and the content 504 may all reside on the same device. In other embodiments, any combination of the authorization module 516, the DRM systems, and the content 504 may be on separate devices. For example, the DRM system 512 may be on one device, and the authorization module 516 may be on another device. The authorization module 516 may also be a network service that runs on a server or within another device on a network. Although only one content 504 and DRM system 512 are shown in FIG. 5, the authorization module may enable access to a variety of different types of content which may be protected by a variety of different DRM systems based on a variety of license metadata and credentials for each of the different DRM systems.

Figure 6:
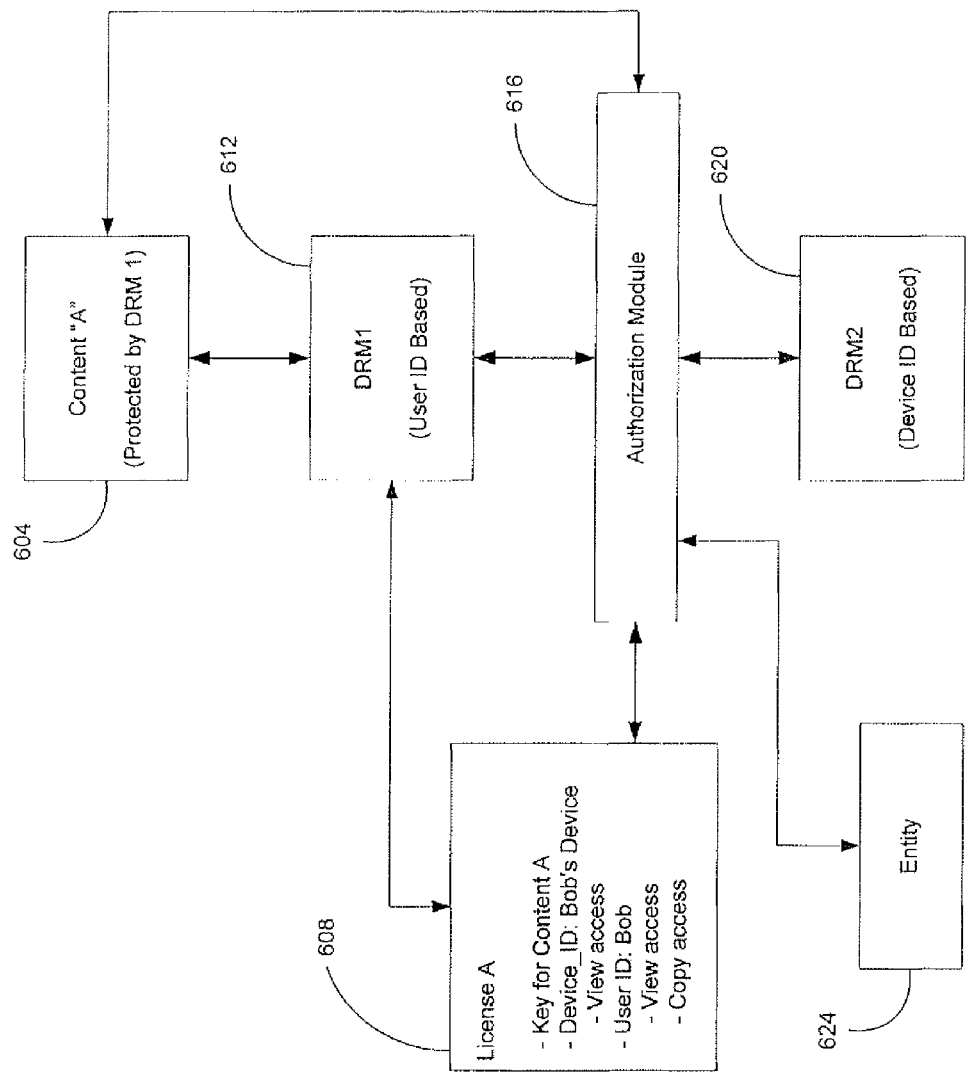
FIG. 6 is a block diagram illustrating a system for accessing digital content according to a second embodiment.

FIG. 6 is a block diagram illustrating a system for accessing digital content according to a second embodiment. In the embodiment shown in FIG. 6, a user or application is attempting to access digitally protected content 604 which is protected by DRM system 612. In this example, license 608 is associated with content 604 and contains credential, key, usage rights, and access level information for content 604. The user provides license metadata to the first DRM system 612.

In one embodiment, the second DRM system 620 may be a completely different DRM system from the first DRM system 612. For example, the first DRM system 612 may be the Apple FairPlay DRM and the second DRM system 620 may be the Windows Media DRM. In another embodiment, the second DRM 620 may be a different and/or enhanced version of the first DRM system. For example, the first DRM system 612 may be version 1 of a particular type of DRM system which only accepts user identity credentials and the second DRM system 620 may be version 2 of the DRM system. Version 2 of the DRM system may have enhanced features. For example, version 2 of the DRM may use a different method of encrypting, may be able to access additional content formats, or it may accept more types of credentials then version 1 such as device identity credentials.

In one embodiment the DRM system 612 then provides the license metadata to the authorization module 616. In another embodiment, the authorization module 616 may itself retrieve the license metadata from DRM 612 or from license 608. Authorization module 616 provides the license metadata to the second DRM system 620 which verifies the license metadata. For example, the second DRM system 620 may verify that a user ID is valid. After verifying the license metadata, the second DRM system 620 may derive access data using the license metadata. For example, the second DRM system 620 may derive a key that may be used to access the content. Or, the second DRM system 620 may derive a function which may be used to retrieve a key. After deriving the access data, the second DRM system 620 provides the access data to authorization module 616. DRM system 620 may also provide access level or access rights information along with the access data to authorization module 616. For example, DRM 620 may determine that the user is only allowed to view the content given the provided license metadata and it may provide this access level information to authorization module 616. Authorization module 616 then enables access to the content 604 using the access data. Alternatively, authorization module 616 may itself determine the level of access allowed to the content 604 for the provided license metadata.

In one embodiment, the authorization module 616 may itself enable access to content 604. For example, after receiving access data from DRM system 620, the authorization module 616 may use the access data to unlock the content 604. In another embodiment, the authorization module 616 may provide the access data to first DRM system 612 and first DRM system 612 may enable access to the content 604. For example, the authorization module 615 may receive access data and then provide the access data to DRM system 612. DRM system 612 may then use the access data to unlock the content 604.

In another embodiment, an entity 624 such as a user or an application may provide at least one credential to the authorization module 616 for verification. For example, a user may have provided only a user ID such as an email address when attempting to access content 604. Authorization module 616 may provide the email address to the second DRM system 620 which may verify that the email address provided is a valid email address. It may then prompt the user for a password. Authorization module 616 would then receive the password, provide the password to the second DRM system 620 which would verify that the password is valid for the email address, and then derive access data such as a key using the email address and the password. After deriving the key, the second DRM system 620 provides the key to the authorization module 616 which may then enable access to the content 604 or provide the key to the first DRM system 612 so that DRM system 612 may then enable access to the content 604.

Alternatively, the second DRM system 620 may derive access data based on only the license metadata. The second DRM system 620 may use the at least one credential for additional verification of the identity of the user or application requesting access to the content 604. After verifying the at least one credential, the second DRM system 620 may then provide the access data to the authorization module 616. The authorization module 616 may use the access data received from the second DRM system 620 to enable access to the content 604.

In another embodiment, the authorization module 616 may itself, verify the at least one credential. The second DRM system 620 may derive access data based on the license metadata provided by the authorization module 616. The second DRM system 620 may then provide the access data to the authorization module 616. The authorization module 616 may then verify the at least one credential for additional verification of the identity of the user or application requesting access to the content. After verifying the at least one credential, the authorization module 616 may use the access data it received from the second DRM system 620 to enable access to the content 604.

In another embodiment, the provided license metadata may contain a device ID when attempting to access content 604. The second DRM system 620 may verify that the device ID is valid. The authorization module 616 may then request that the user provide an additional credential, such as a username and password. The authorization module 616 may directly verify the credential or provide the credential to the second DRM system 620. If the authorization module 616 directly verifies the credential, the second DRM system 620 may derive access data based on the license metadata and provide the access data to the authorization module 616. The authorization module 616 may then verify the credential, and then enable access to the content using the access data, after verifying the credential. If the authorization module 616 provides the credential to the second DRM system 620, the second DRM system 620 may derive access data based on the license metadata and not on the credential, or it may derive access data based on the license metadata and the credential. The second DRM system 620 may then provide the access data to the authorization module 616. If the second DRM system 620 derives access data based only on the license metadata, it may provide the access data to authorization module 616 only if the credential is verified. The authorization module 616 may then use the access data to enable access to content 604. In some embodiments, different levels of access to content 604 may be granted based on the license metadata or based on the license metadata and at least one credential. The different levels of access granted to different license metadata and credentials may be hierarchical. Certain license metadata and credentials may be granted more access to content 604 then other license metadata and credentials. For example, if a valid domain ID is provided to authorization module 616, the authorization module 616 may only enable read and copy access to content 604. However, if a valid device ID is provided to authorization module 616, the authorization module may enable read, copy, edit and record access to content 604. The hierarchical level of access may be specified in the license 608. For example, the license 608 itself may specify that a valid device ID is only allowed read and copy access to content 604. Or, the hierarchical levels of access may be contained within the authorization module 616. If no levels of access are specified for a license metadata or credential, a default level of access may be granted to content 604. The default level of access may be specified in the license 608 or within the authorization module 616. In another example, if license metadata comprising a valid user ID and password is provided to authorization module 616, the authorization module 616 may only enable read and copy access to content 604. However, if a credential such as a valid domain ID is provided to authorization module 616 in addition to the license metadata, the authorization module 616 may enable read, copy, edit and record access to content 604.

In certain embodiments, the authorization module 616 may be "trusted" by different DRM systems it may interact with. For example, DRM system 612 trusts the authorization module 616 enough such that it will provide means to validate the integrity of license 608, and provide license metadata to authorization module 616 and will allow authorization module 616 to enable access to content 604. The authorization module 616 may communicate securely with DRM system 612 and DRM system 620. For example, authorization module 616 may use a secure or encrypted communication channel to communicate with the different DRM systems. There are many methods of secure communication including but not limited to using encrypted channels, using secured authenticated channels, and sending and receiving encrypted data. This specification does not limit the methods or systems that may be used by the authorization module 616 to securely communicate with different DRM systems.

In one embodiment, the authorization module may be integrated with at least one of the DRM system 612 and DRM system 620. For example, different DRM system developers may include the authorization module 616 within the DRM system. In another embodiment, the authorization module 616 may be a separate module that is not integrated with either DRM system 612 or DRM system 620. For example, the authorization module 616 may comprise a software executable that resides in memory on a computing device and is executed by the computing device's processor. In some embodiments, the authorization module 616, the DRM systems and the content 604 may all reside on the same device. In other embodiments, any combination of the authorization module 616, the DRM systems, and the content 604 may be on separate devices. For example, the DRM system 612 may be on one device, DRM system 620 may be on a second device and the authorization module 616 may be on a third device. Or DRM system 612 and authorization module 616 may be on one device, and DRM system 620 may be on another device. The authorization module 616 or the DRM system 620 may also be a network service that runs on a server or within another device on a network. Although only one content 604 and two DRM systems 612 and 620 are shown in FIG. 6, the authorization module 616 may enable access to a variety of different types of content which may be protected by a variety of different DRM systems based on a variety of license metadata and credentials for each of the different DRM systems.

Figure 7:
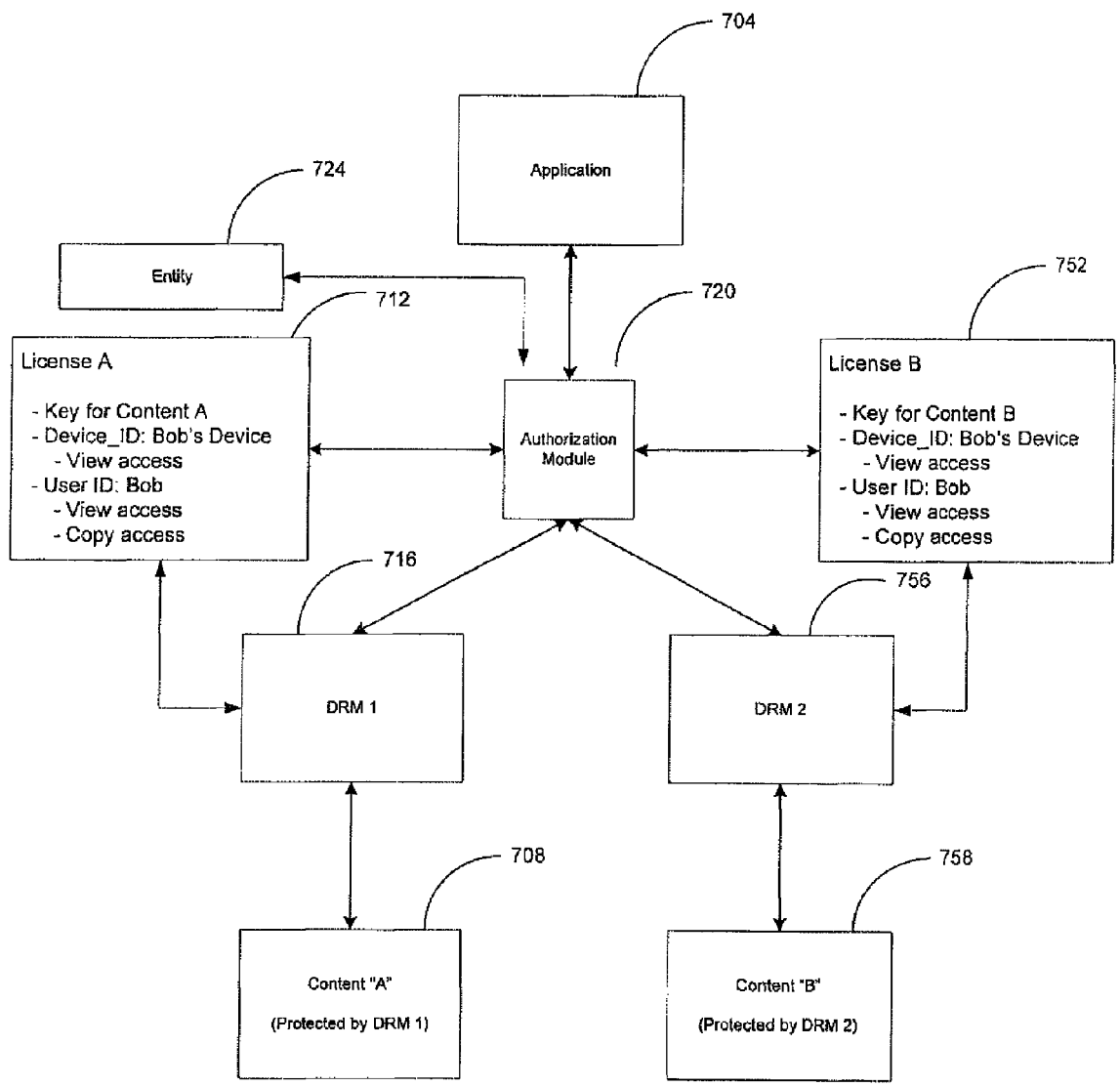
FIG. 7 is a block diagram illustrating a system for accessing digital content according to a third embodiment.

FIG. 7 is a block diagram illustrating a system for accessing digital content according to a third embodiment. In the embodiment shown in FIG. 7, an application 704 which is not associated with the first DRM system 716 is attempting to access digitally protected content 708 which is protected by DRM system 716. For example, an instance of the Apple iTunes application may request access to a movie file protected by Windows Media DRM. In this example, license 712 is associated with content 708 and contains credential, key, usage rights, and access level information for content 708. The application 704 provides a first set of credentials to the first authorization module 720. The first set of credentials may comprise at least one credential. The authorization module 720 then verifies the first set of credentials. For example, the authorization module 720 may verify that a device ID is valid. After verifying the first set of credentials, the authorization module 720 instructs DRM system 716 to grant the application 704 access to content 708.

In another embodiment, an entity 724 such as a user or an application may provide a second set of credentials to the authorization module 720 for verification. The second set of credentials may comprise at least one credential. For example, a user may have provided only a user ID such as an email address when attempting to access content 708. Authorization module 720 may verify that the email address provided is a valid email address. It may then prompt for a password. Authorization module 720 would then receive the password, verify that the password is valid for the email address, and instruct DRM system 716 to grant application 704 access to content 708. In another example, the device ID may have been provided when attempting to access content 708. Authorization module 720 may verify that the device ID is valid. It may then prompt for a second set of credentials, such as a username and password. Authorization module 720 would then receive the username and password, verify the username is valid and the password is associated with such username, and instruct DRM system 716 to grant application 704 access to content 708.

In some embodiments, different levels of access to content 708 may be granted based on at least one of the first and second sets of credentials. The different levels of access granted to the first and second sets of credentials may be hierarchical. Certain sets of credentials may be granted more access to content 708 then other sets of credentials. For example, if a valid device ID is provided to authorization module 720, the authorization module 720 may only enable read and copy access to content 708. However, if a valid user ID is provided to authorization module 720, the authorization module may enable read, copy, edit and record access to content 708. The hierarchical level of access may be specified in the license 712. For example, the license 712 itself may specifiy that a valid device ID is only allowed read and copy access to content 708. Or, the hierarchical levels of access may be contained within the authorization module 720. If no levels of access are specified for a license metadata or credential, a default level of access may be granted to content 708. The default level of access may be specified in the license 712 or within the authorization module 720. In another example, if a first set of credentials comprising a user ID and a second set of credentials comprising a domain ID are provided to the authorization module 720, authorization module 720 may only grant read and copy access to content 708. But if a first set of credentials comprising a user ID and a second set of credentials comprising a domain ID and a device ID are provided to the authorization module 720, authorization module 720 may grant read, copy, edit and record access to content 708.

In certain embodiments, the authorization module 720 may be "trusted" by different DRM systems it may interact with. For example, DRM system 716 trusts the authorization module 720 enough such that it will grant application 704 access to the content 708 when instructed by the authorization module 720. The authorization module 720 may communicate securely with DRM system 716. For example, authorization module 720 may use a secure or encrypted communication channel to communicate with the different DRM systems. There are many methods of secure communication including but not limited to using encrypted channels, sending and receiving encrypted data, and using and using secured authenticated channels. This specification does not limit the methods or systems that may be used by the authorization module 720 to securely communicate with different DRM systems.

FIG. 7 also shows DRM system 756, content 758 and license 752. The authorization module 720 may also instruct DRM 756 to grant application 704 access to content 758 as described above. In one embodiment, the authorization module 720 may be integrated with at least one of the DRM system 716 and DRM system 756. For example, different DRM system developers may include the authorization module 720 within the DRM system. In another embodiment, the authorization module 720 may be a separate module that is not integrated with either DRM system 716 or DRM system 756. For example, the authorization module 720 may comprise a software executable that resides in memory on a computing device and is executed by the computing device's processor. In some embodiments, the authorization module 720, the DRM systems and the content 708 may all reside on the same device. In other embodiments, any combination of the authorization module 720, the DRM systems, and the content 708 may be on separate devices. For example, the DRM systems 716 and 756 may be on one device, and the authorization module 720 may be on another device. The authorization module 720 may also be a network service that runs on a server or within another device on a network. Although only two contents 708 and 758, and two DRM systems 716 and 756 are shown in FIG. 7, the authorization module 720 may instruct a variety of different types of DRM systems to grant access to a variety of digitally based content based on different sets of credentials.

Figure 8:
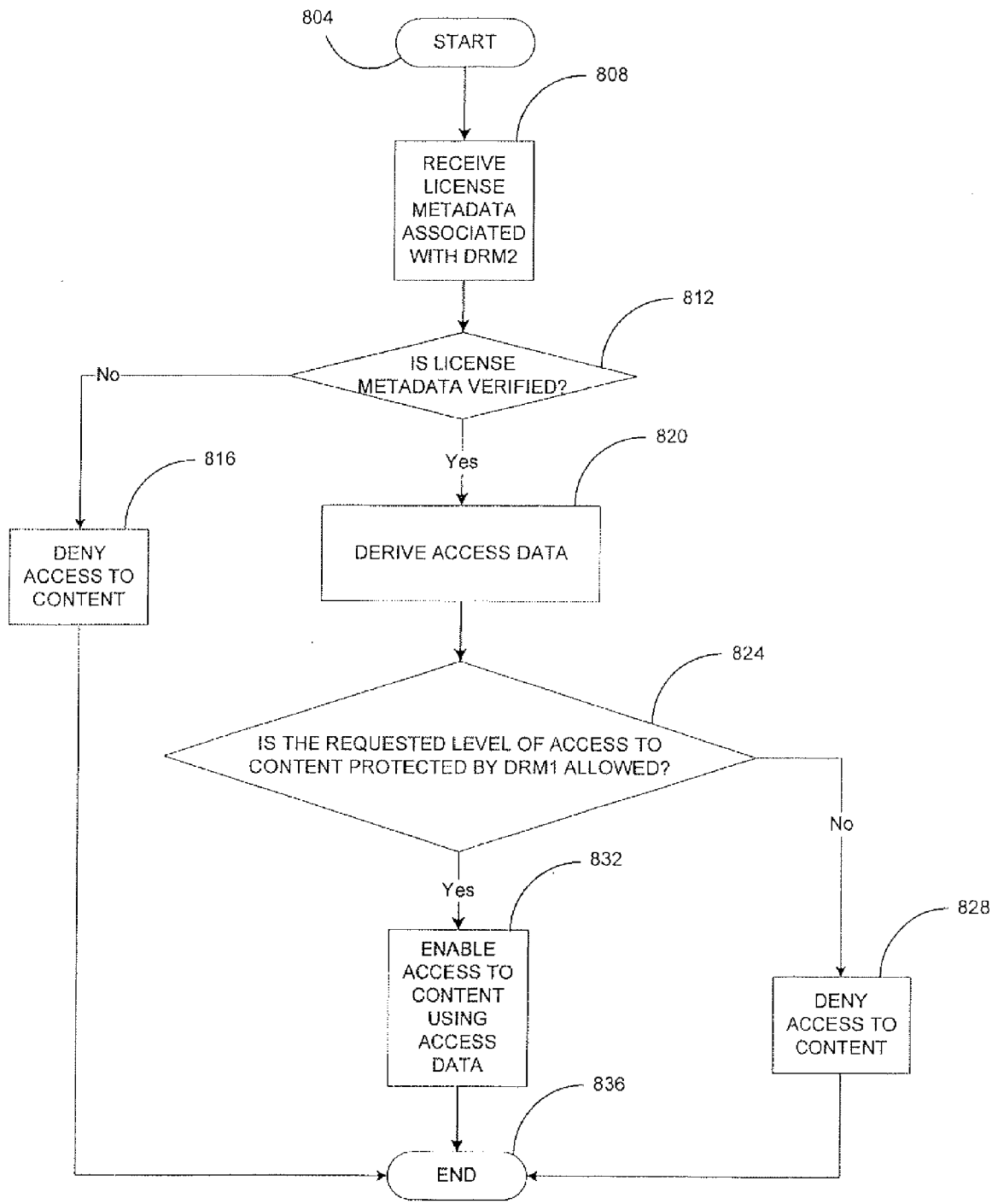
FIG. 8 is a flow diagram of an embodiment of a digital rights management process according to a fourth embodiment.

FIG. 8 is a flow diagram of an embodiment of a digital rights management process according to a fourth embodiment. In this example, the user is attempting to access digitally protected content protected by a first DRM using license metadata associated with a second DRM system. The content is associated with a license which may contain credentials, keys, usage rights and access level information. The user may be using an embodiment as shown in FIG. 5.

At the start block 804, the user attempts to access content, such as content 504. A first DRM system, such as DRM 512, receives the license metadata and provides it to an authorization module, such as authorization module 516. The authorization module 516 then receives the license metadata at block 808. Alternatively, the authorization module 516 may itself retrieve the license metadata from the first DRM system 512 or from license 508. Then, at block 812, the authorization module 516 attempts to verify the license metadata. If the license metadata is not valid, the process then moves to block 816 where access to the content is denied and then moves to the end block 836. In one embodiment, the authorization module 516 may, at block 812, additionally prompt for and receive at least one credential from an entity such as entity 520, which may be a user or an application. The authorization module may then additionally verify the at least one credential. If only the license metadata was received, the process will move on to block 820 after verifying the license metadata. If license metadata and at least one credential were received, the process will move on to block 820 after verifying the license metadata and the at least one credential. As discussed above in FIG. 5, the access data may be derived using the license metadata and the credential may be used for additional verification purposes. Or the access data may be derived using both the license metadata and the at least one credential. At block 820, the authorization module 516 will derive access data using the license metadata or using the license metadata and at least one credential.

After deriving the access data, the process then moves to block 824 where the authorization module 516 checks whether or not the requested level of access to the content 504 is allowed. For example, the user may have requested copy access and provided license metadata. The authorization module 516 will check to see if copy access to the content 504 is allowed for the provided license metadata or license metadata and at least one credential. The authorization module may use a license for the content 504, such as license 508, to determine if the requested level of access is allowed. Alternatively, the authorization module itself may have information needed to determine if the requested level of access is allowed. As described above, the different levels of access granted to different license metadata and credentials may be hierarchical.

If the requested level of access is not allowed, the process move to block 828 where access to the content 504 is denied and then moves to the end block 836. If the requested level of access is allowed, the process moves to block 832 where access to the content 504 is enabled. In one embodiment, the authorization module 516 uses the access data to grant access to the content 504 at block 832. In another embodiment, the authorization module 504 provides the access data to the first DRM system 512 and the first DRM system 512 uses the access data to grant access to the content 504 at block 832. The process the moves to the end block 836.

In particular embodiments, the steps described in FIG. 8 may be performed in a different order, may be performed simultaneously and certain of the steps may be omitted.

Figure 9:
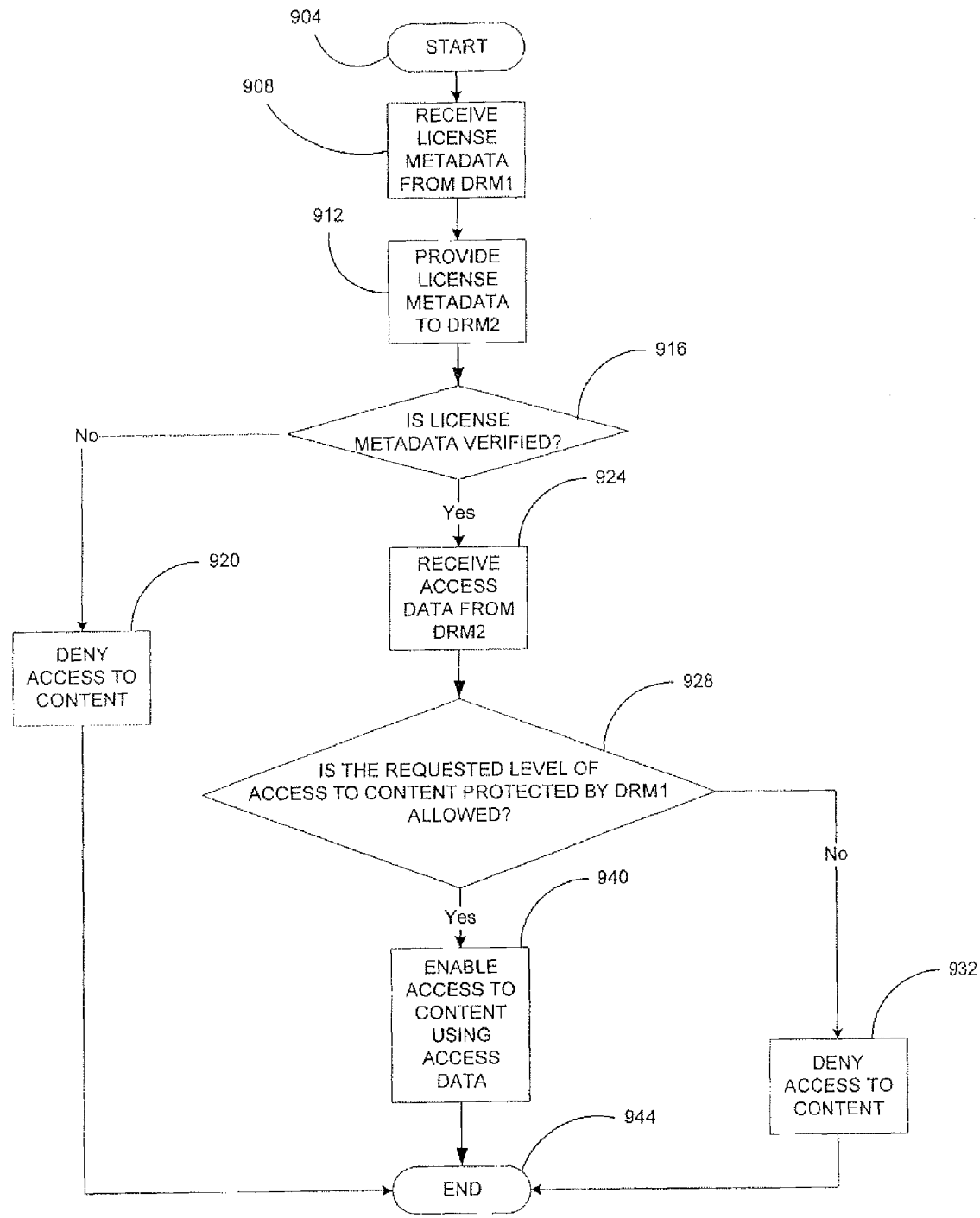
FIG. 9 is a flow diagram of an embodiment of a digital rights management process according to a fifth embodiment.

FIG. 9 is a flow diagram of an embodiment of a digital rights management process according to a fifth embodiment. In this example, a user or application is attempting to access digitally protected content, such as content 604, protected by a first DRM, such as DRM 612, using license metadata. The content is associated with a license such as license 608 which may contain credentials, keys, usage rights and access level information. The user may be using an embodiment as shown in FIG. 6.

At the start block 904, the user attempts to access the content 604. The first DRM 612 receives the license metadata and provides it to the authorization module such as authorization module 616. Alternatively, the authorization module 616 may itself retrieve the license metadata from the first DRM system 612 or from license 608. The authorization module 616 then receives the license metadata at block 908. Then, at block 912, the authorization module 616 provides the license metadata to a second DRM system, such as DRM system 620 which attempts to verify the license metadata. If the license metadata is not valid, the process then moves to block 920 where access to the content 604 is denied and then moves to the end block 944. In one embodiment, the authorization module 616 may, at block 916, additionally prompt for and receive at least one credential from an entity such as entity 624, which may be a user or an application. The authorization module 616 may then additionally provide the at least one credential to the second DRM system 620 which may verify the at least one credential. Alternatively, the authorization module 616 may itself verify the at least one credential and may not provide the at least one credential to the second DRM system 620 as is discussed below. If the authorization module 616 did not provide the at least one credential to the second DRM system 620, the process will move on to block 924 after verifying the license metadata. If license metadata and at least one credential were received, the process will move on to block 924 after verifying the license metadata and the at least one credential. As discussed above, in FIG. 6, the second DRM system 620 may derive access data using only the license metadata and use the at least one credential for additional verification or the second DRM system 620 may derive access data using both the license metadata and at least one credential. At block 924, the authorization module 616 receives access data from the second DRM system 620.

After receiving the access data, the process then moves to block 928 where the authorization module 616 checks whether or not the requested level of access to the content 604 is allowed. For example, the user may have requested copy access and provided license metadata. The authorization module 616 will cheek to see if copy access to the content 604 is allowed for the provided license metadata or license metadata and at least one credential. The authorization module 616 may use the license for the content 604, such as license 608, to determine if the requested level of access is allowed. Alternatively, the authorization module 616 itself may have information needed to determine if the requested level of access is allowed. As described above, the different levels of access granted to different license metadata and credentials may be hierarchical. If the requested level of access is not allowed, the process moves to block 932 where access to the content 604 is denied and then moves to the end block 944. If the requested level of access is allowed, the process moves to block 940 where access to the content 604 is enabled. Additionally, if the authorization module 616 did not provide the at least one credential to the second DRM system 620, it may verify the at least one credential at block 928, and if the credential is valid, the process moves to block 940. If the credential is not valid, access to the content 604 is denied and the process moves to block 932. In one embodiment, the authorization module 616 uses the access data to grant access to the content 604 at block 940. In another embodiment, the authorization module provides the access data to the first DRM system and the first DRM system uses the access data to grant access to the content at block 940. The process the moves to the end block 944.

In particular embodiments, the steps described in FIG. 9 may be performed in a different order, may be performed simultaneously and certain of the steps may be omitted.

Figure 10:
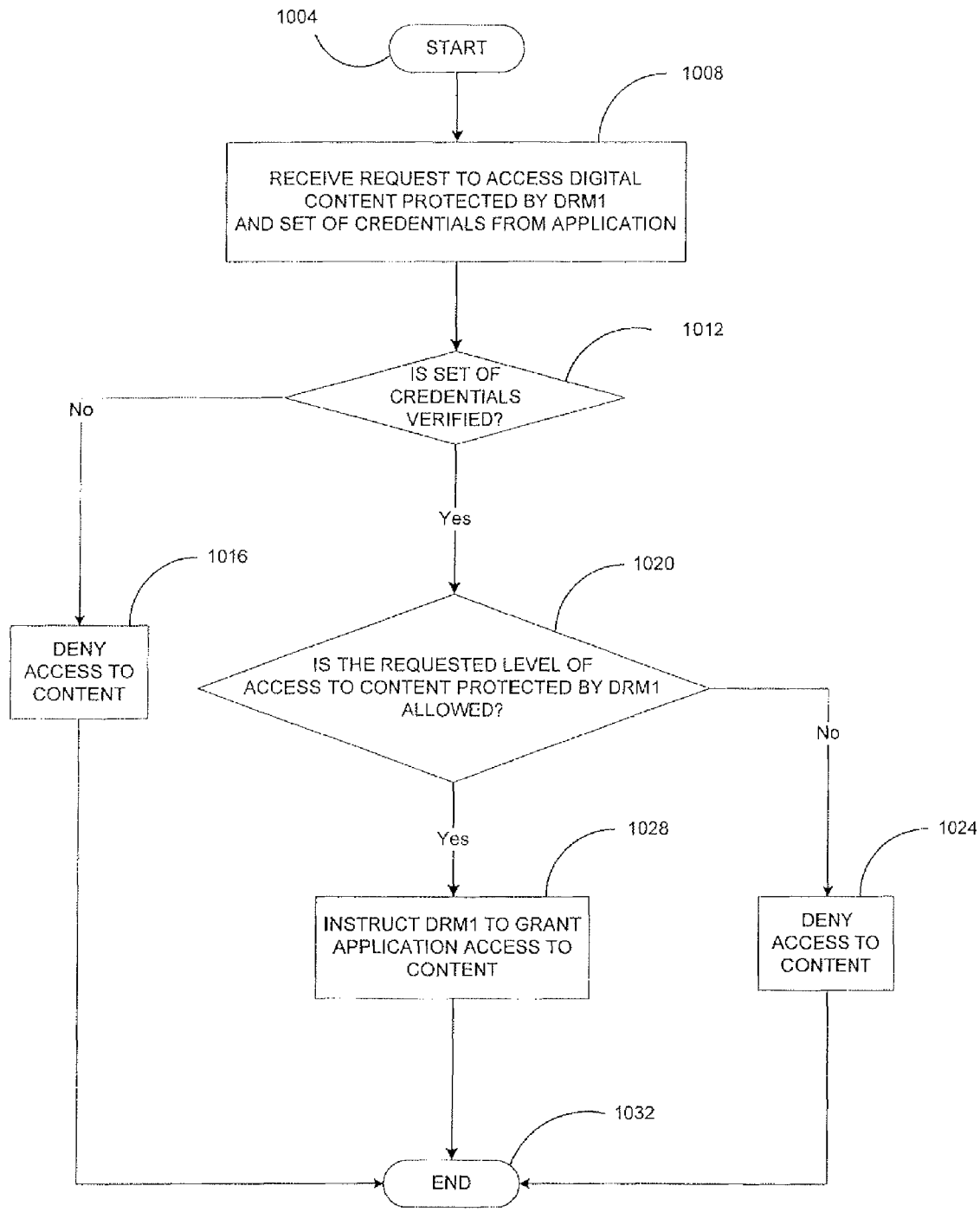
FIG. 10 is a flow diagram of an embodiment of a digital rights management process according to a sixth embodiment.

FIG. 10 is a flow diagram of an embodiment of a digital rights management process according to a sixth embodiment. In this example, an application which is not associated with the first DRM system is requesting access to digitally protected content protected by a first DRM using license metadata. The content is associated with a license which may contain credentials, keys, usage rights and access level information. The user may be using an embodiment as shown in FIG. 7.

At the start block 1004, an application, such as application 704, requests access to content, such as content 708, and provides a first set of credentials. An authorization module, such as 720, then receives the first set of credentials and the request for access at block 1008. The process then moves to block 1012 where the authorization module 720 attempts to verify the first set of credentials. If first set of credentials is not valid, the process then moves to block 1016 where access to the content 708 is denied and then moves to the end block 1032. In one embodiment, the authorization module 720 may, at block 1012, additionally prompt for and receive a second set of credentials from an entity such as entity 724, which may be a user or an application. The authorization module 720 may then additionally receive and verify the second set of credentials. If only a first set of credentials was received, the process will move on to block 1020 after verifying the license metadata. If a first set and a second set of credentials were received, the process will move on to block 1020 after verifying the license metadata and the at least one credential.

At block 1020, the authorization module 720 checks whether or not the requested level of access to the content 708 is allowed. For example, the application may have requested copy access and provided license metadata. The authorization module 720 will check to see if copy access to the content 708 is allowed for the provided license metadata or license metadata and at least one credential. The authorization module 720 may use the license for the content 708, such as license 712, to determine if the requested level of access is allowed. Alternatively, the authorization module 720 itself may have information needed to determine if the requested level of access is allowed. As described above, the different levels of access granted to different license metadata and credentials may be hierarchical.

If the requested level of access is not allowed, the process move to block 1024 where access to the content 708 is denied and then moves to the end block 1032. If the requested level of access is allowed, the process moves to block 1028 where the authorization module 720 will instruct the first DRM system, such as DRM 716, to grant the application 704 access to the digitally protected content 708.

In particular embodiments, the steps described in FIG. 10 may be performed in a different order, may be performed simultaneously and certain of the steps may be omitted.

The above-described method may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method comprising:
   receiving, using a processor, license metadata from an entity for accessing a digital content protected by a first digital rights management system, wherein the license metadata is associated with a second digital rights management system;

receiving, using the processor, one or more credentials from the entity;

verifying, using the processor, the one or more credentials and the license metadata associated with the second digital rights management system;

deriving access data for accessing the digital content protected by the first digital rights management system using the license metadata associated with the second digital rights management system;

enabling a first level of access to the digital content using the access data if the one or more credentials are identity-based, enabling a second level of access to the digital content using the access data if the one or more credentials are device-based, and enabling a third level of access to the digital content using the access data if the one or more credentials are domain-based, wherein the first level of access provides more rights to the digital content than the second level of access, and the second level of access provides more rights to the digital content than the third level of access; and wherein the first digital rights management system is of a first type selected from an identity-based DRM system, a device-based DRM system and a domain-based DRM system, wherein the second digital rights management system is of a second type, and wherein the first type is different than the second type.

2. The method of claim 1, wherein receiving the license metadata, receiving the one or more credentials, verifying the one or more credentials and the license metadata, and deriving access data are performed by an authorization module.

3. The method of claim 2, wherein the authorization module is configured to communicate securely with the first digital rights management system.

4. The method of claim 1, wherein the enabling access is performed by an authorization module.

5. The method of claim 1, wherein the enabling access is performed by the first digital rights management system.

6. The method of claim 1, wherein the second type is selected from the identity-based DRM system, the device-based DRM system and the domain-based DRM system.

7. The method of claim 1, wherein the rights include:
viewing the digital content;
copying the digital content;
editing the digital content; and
recording the digital content.

8. The method of claim 1, wherein the first level of access includes rights to view, copy and record the digital content, the second level of access includes rights to view and copy the digital content, and the third level of access includes rights to view the digital content.

9. A system comprising:
a processor configured to:
receive license metadata from an entity for accessing a digital content protected by a first digital rights management system, wherein the license metadata is associated with a second digital rights management system;
receive one or more credentials from the entity;
verify the one or more credentials and the license metadata associated with the second digital rights management system;
derive access data for accessing the digital content protected by the first digital rights management system using the license metadata associated with the second digital rights management system; and
enable a first level of access to the digital content using the access data if the one or more credentials are identity-based, enabling a second level of access to the digital content using the access data if the one or more credentials are device-based, and enabling a third level of access to the digital content using the access data if the one or more credentials are domain-based, wherein the first level of access provides more rights to the digital content than the second level of access, and the second level of access provides more rights to the digital content than the third level of access; and
wherein the first digital rights management system is of a first type selected from an identity-based DRM system, a device-based DRM system and a domain-based DRM system, wherein the second digital rights management system is of a second type, and wherein the first type is different than the second type.

10. The system of claim 9, wherein receiving the license metadata, receiving the one or more credentials, verifying the one or more credentials and the license metadata, and deriving access data are performed by an authorization module.

11. The system of claim 10, wherein the authorization module is configured to communicate securely with the first digital rights management system.

12. The system of claim 9, wherein the enabling access is performed by an authorization module.

13. The system of claim 9, wherein the enabling access is performed by the first digital rights management system.

14. The system of claim 9, wherein the second type is selected from the identity-based DRM system, the device-based DRM system and the domain-based DRM system.

15. The system of claim 9, wherein the rights include:
viewing the digital content;
copying the digital content;
editing the digital content; and
recording the digital content.

16. The system of claim 9, wherein the first level of access includes rights to view, copy and record the digital content, the second level of access includes rights to view and copy the digital content, and the third level of access includes rights to view the digital content.

* * * * *